United States Patent Office 3,153,075
Patented Oct. 13, 1964

3,153,075
COMPLEXES OF TRIALKYLALUMINUM WITH MIXED ALKALI METAL CYANIDES
Wolf R. Kroll, Witten-Annen, Germany, assignor to Continental Oil Company, Ponca City, Okla., a corporation of Delaware
No Drawing. Filed July 12, 1960, Ser. No. 39,200
6 Claims. (Cl. 260—448)

This invention relates to complexes of trialkylaluminum compounds with mixtures of alkali metal cyanides.

Heretofore, several methods have been proposed for the production of higher olefins from lower olefins. In general, these proposed methods have involved the reaction of a trialkylaluminum compound with a lower olefin, specifically, ethylene to form the so-called growth product. After forming the growth product, it is heated in the presence of an additional quantity of ethylene and a finely divided metal catalyst, such as finely divided nickel. Finally, the higher olefin is recovered from the reaction mass by distillation. The former reaction may be illustrated equationwise as follows:

(1)
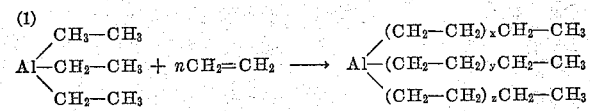

wherein $x$, $y$, and $z$ represent integers ranging from 0–14 (average 3–7) and $x+y+z=n$.

The foregoing reaction may be carried out by passing ethylene through triethylaluminum, preferably in the presence of a diluent under a wide variety of reaction conditions, e.g., 65°–150° C. and 200–5000 p.s.i.g., preferably 90°–120° C. and 1000–3500 p.s.i.g. It is to be understood that, instead of employing triethylaluminum as the starting trialkylaluminum in the above reaction, other low molecular weight alkyl ($C_2$–$C_4$) aluminum compounds such as tripropylaluminum, tributylaluminum, triisobutylaluminum, diethylaluminum hydride, ethylaluminum dihydride, etc., may be employed; and in lieu of ethylene, other low molecular weight aliphatic mono-1-olefins, such as propylene and the like may be substituted. Generally, $C_2$–$C_4$ olefins are preferred as the growth hydrocarbon compound.

The higher olefins are produced by heating growth product, usually at a temperature from about 50 to about 150° C. for 1 to 30 minutes in the presence of an additional quantity of ethylene and a catalyst, which process is known as the displacement reaction. The displacement reactions can be illustrated equationwise as follows:

(2) $Al(CH_2$—$CH_2$—$R)_3 + 3C_2H_4 \rightleftarrows$
$Al(C_2H_5)_3 + 3R$—$CH=CH_2$ wherein R=H, $C_2H_5$, $C_4H_9$, $C_6H_{13}$, etc.

It has been suggested that the alpha-olefins and the triethylaluminum produced in the displacement reaction can be recovered by fractional distillation. It has been suggested further that, after the separation of the triethylaluminum and the alpha-olefins, the triethylaluminum can be returned to the growth reaction and the alpha-olefins to storage. The actual process, however, is not as simple as Equation 2 indicates. This is true, because the triethylaluminum and the alpha-olefins contained in the displacement products tend to undergo a reverse displacement reaction; and for that reason Equation 2 is written as a reversible reaction. Furthermore, under the conditions present, there is a tendency for the alpha-olefins to isomerize at atmospheric pressure. Investigations have demonstrated, conclusively, that the reverse displacement reaction and the tendency of the alpha-olefins to isomerize are both accelerated by the catalyst employed in the initial reaction.

In addition to the process difficulties outlined above, considerable difficulty is encountered in the separation of the different reaction or displacement components from each other by distillation. It has been found that, when triethylaluminum is reacted with ethylene and the resulting growth product is subjected to the displacement reaction, the reaction product will comprise in addition to the solvent the following components listed in order of ascending boiling points;

| | |
|---|---|
| Ethylene | Tetradecene-1 |
| Butene-1 | Hexadecene-1 |
| Hexene-1 | Octadecene-1 |
| Octene-1 | Eicosene-1 |
| Decene-1 | Higher olefins; unreacted $AlR_3$ |
| Dodecene-1 | |
| Aluminum triethyl | |

As a specific example, it is impractical to separate triethylaluminum from dodecene-1 by ordinary methods of fractional distillation.

It is an object of this invention to provide novel compositions of matter for use in the separation of alpha-olefins from other products of the displacement reaction.

Other objects and advantages of the invention will be apparent as the description proceeds.

To the accomplishment of the foregoing and related ends, this invention comprises the features hereinafter fully described and particularly pointed out in the claims, the following description setting forth in detail certain illustrative embodiments of the invention, these being indicative, however, of but a few of the various ways in which the principle of the invention may be employed.

The foregoing objects are realized broadly by reacting trialkylaluminum with a mixture of alkali metal cyanides to form a complex of said mixed cyanides with trialkylaluminum.

The mixed cyanides suitable for use as complexing agents are the alkali metal cyanides, especially sodium and potassium cyanides. Lithium cyanide is, of course, suitable. It has been found that the mixed cyanides, e.g., NaCN and KCN react with triethylaluminum substantially according to the following equations:

(3) $0.5NaCn + 0.5KCN + 1.5Al(C_2H_5)_3$
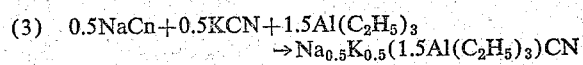

(4) $Na_{0.5}K_{0.5}(1.5Al(C_2H_5)_3)CN + 0.5Al(C_2H_5)_3$
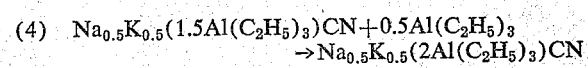

Broadly the complexes are defined by the generic formula:

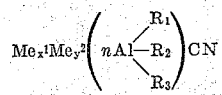

wherein $Me^1$ and $Me^2$ are different alkali metals, $x+y=1$, $n=1.5$ to 2, and $R_1$, $R_2$ and $R_3$ are alkyl groups.

The mixed alkali metal cyanides act as effective poisons of the reduction catalyst, the presence of which ordinarily promotes the reverse displacement and isomerization reactions. Only small amounts of mixed alkali metal cyanides are required to inhibit the reverse displacement reaction. Depending on the reducing catalyst, employed, the quantity of mixed alkali metal cyanides usually varies from about 5 to about 200 parts by weight per part by weight of catalyst. When the mixed alkali metal cyanides are further employed to form the complexes of this invention, e.g., in the process of separating the components of the displacement reaction, the amount of the mixed alkali metal cyanides used should be sufficient to react with all of the triethylaluminum present as in Equation 3 or when the mixed alkali metal cyanide-triethyaluminum complex is used the amount of complex to be added is determined from Equation 4. Generally, it is preferred to use the theoretical amount as shown by the equations.

Formation of the mixed alkali metal cyanide-trialkylaluminum complexes is usually at temperatures ranging from room temperature to about 150° C. In general, any temperature can be used, since the complexes are formed equally well at room temperature, as well as at more elevated temperatures. It is necessary, of course, that the temperature be maintained below the decomposition temperature of the complex. The complexes have variable solubility in solvents, for example, being more soluble in aromatic than in paraffinic compounds. Solubility of the complexes also varies with temperature. As a matter of preference, it is desirable that the complex be in the liquid state; therefore usually some degree of heating is employed, the quantity of heat added depending on the particular solvent which is used in the process. The time required to effect formation of the complex can vary widely but is usually from 1 to about 30 minutes. The complexes can be prepared, for example, by reacting the desired amounts of each alkali metal cyanide with the trialkylaluminum or by mixing calculated amounts of individual alkali metal cyanide-complexes. As indicated by the general formula, the quantity of each alkali metal cyanide is variable, with the total equaling one mole in the complex.

As pointed out previously, the complexes find particular application in the separation of alpha-olefins from triethylaluminum. In this process, the mixed cyanides are first complexed with triethylaluminum. The complex compounds (mixed cyanide-triethylaluminum complexes) and the alpha-olefins form separate layers, making it easy to remove the alpha-olefins by decanting or other similar means. If desired, the recovered alpha-olefins can be washed to remove any residual triethylaluminum that may be present in the recovered upper layer. Finally, the alpha-olefins can be subjected to fractional distillation. The complex salt can then be heated, bringing about its decomposition either to the 1.5:1 complex or to the mixed alkali metal cyanides and the triethylaluminum. The thermal decomposition reactions can be illustrated as follows:

(5) $Na_{0.5}K_{0.5}(2Al(C_2H_5)_3)CN$
$\rightarrow Na_{0.5}K_{0.5}(1.5Al(C_2H_5)_3)CN + 0.5Al(C_2H_5)_3$ (6) $Na_{0.5}K_{0.5}(1.5Al(C_2H_5)_3)CN$
$\rightarrow 0.5NaCN + 0.5KCN + 1.5Al(C_2H_5)_3$ It has been found that there is a direct relationship between the temperature at which the complex is heated to bring about its decomposition and the pressure. Specifically, if the pressure varies from 1 to 500 mm. of mercury, a suitable temperature range varies from about 100 to 200° C. Generally, it is preferred to operate under a pressure varying from 1 to 20 mm. of mercury and a temperature varying from 120 to 180° C. As a rule, the temperature used is above the boiling point of the triethylaluminum at the particular pressure employed. Operating under such conditions makes it possible to remove the triethyl aluminum as it is released from the complex causing the reaction to go to completion.

The complexes of this invention provide a number of advantages over the individual alkali metal cyanide-complexes. By appropriately varying the amount of each alkali metal cyanide in the complex, it is possible to vary the melting points, solubilities in hydrocarbons, the decomposition temperatures, etc. In this manner, it becomes possible to "tailor" the complex to each particular system whereby easier separation is effected between the trialkylaluminum and the alpha-olefins. The complexes of this invention are differentiated from mixtures of individual alkali metal cyanide-complexes, since each complex has a single melting point.

In addition to the procedure hereinbefore described, higher olefins can also be prepared from lower olefins through the reaction of an aluminum compound having the formula:

$$AlR_2OR'$$

with a lower olefin. This is accomplished by forming a growth product and displacing higher olefins from said growth product in the presence of additional lower olefin and a catalyst system comprising a reducing metal and an alkylaluminum compound. When utilizing the alkoxy aluminum compound, the growth reaction takes place as follows:

(7)

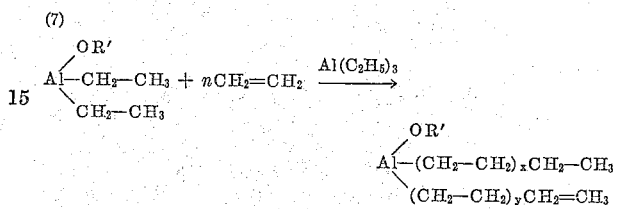

wherein $x$, $y$, and $z$ are defined as in Reaction 1, R is a low molecular weight alkyl group, R' is a hydrocarbon group which can be alkyl, cycloalkyl, aryl, alkaryl, aralkyl, etc., and R and R' can be alike or unlike.

The higher olefins are produced by heating the growth product, under conditions of temperature and time as previously set forth, which process is known as the displacement reaction. This reaction can be illustrated equationwise as follows:

(8)

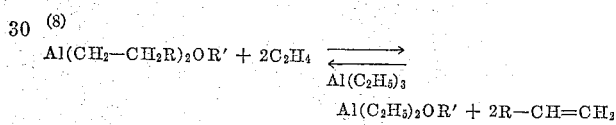

wherein R equals H, $C_2H_5$, $C_4H_9$, $C_6H_{13}$, etc. Treatment of the product of the displacement reaction, prepared in accordance with this method, can be inhibited through the use of mixed alkali metal cyanides in the same manner as hereinbefore described. Similarly, the mixed alkali metal cyanides can be employed to complex with the trialkylaluminum, thereby aiding in the separation and recovery of the alpha-olefin product. When the mixed alkali metal cyanides are employed to complex the trialkylaluminum, the complex may form a separate lower layer from the olefins and alkoxy aluminum compound, depending on the particular solvent in which the reaction is carried out and also on the composition of the alkoxy compound. Various methods can be employed in recovering the alpha-olefins from the reaction product and complex mixture. For example, the olefins can be distilled until the boiling point of the alkoxy compound is reached, after which this compound can also be removed by distillation following which the complex can be decomposed, with recycling and reuse of the decomposed products as hereinbefore set forth. When the complex forms a separate lower layer, the alkoxy aluminum compound and olefins can be separated from the complex layer by decantation, with the complex being decomposed separately and the alkoxy compound and olefins being separated by distillation. In another variation of the recovery procedure, the olefins are distilled, followed by decomposition of the complex and finally distillation of the alkoxy compound. Each of the foregoing procedures find application by the appropriate choice of the OR' group to provide an alkoxy compound having the desired boiling point.

It is also within the scope of the invention to employ in place of the aluminum alkoxy compounds materials having the formula:

$$AlR_2SR'$$

wherein R and R' are defined as previously set forth.

A further understanding of the present invention will be obtained from the following examples which are intended to be illustrative but not limitative of the invention and the scope thereof.

Example 1

(1) Preparation of $Na_{0.5}K_{0.5}(2TEA)CN$ complex.

24.5 grams of NaCN (0.5 mole)
32.5 grams of KCN (0.5 mole)
230.5 grams of aluminum triethyl (2.02 moles)

The mixture was warmed up to 80° under stirring. On cooling, a melting point of 52–54° was obtained, which was confirmed by remelting. (The melting point of the 1:2 sodium cyanide complex is about 59°, while that of the corresponding potassium cyanide complex is about 78° C.)

65 grams complex were stirred with 50 ml. of hexane at 70°. After settling and cooling overnight, the top layer was decanted and analyzed: 0.12 percent Al. This procedure was repeated with the same complex; an aluminum value of 0.11 percent was obtained.

66 grams complex were stirred with 50 ml. dodecene-1 at 80°. After settling and cooling overnight, the top layer was decanted and analyzed: 0.72 percent Al. This procedure was repeated and gave an Al-value of 0.64 percent Al. (For comparison, the corresponding value obtained with the NaCN 2TEA complex was 0.86 percent Al.)

Example 2

In 1.5 hours, 60 grams 1:2 complex of Example 1 were decomposed to the 1:1.5 complex at a bath temperature of 160–200° at 4.5 mm. About 10 grams of distillate were obtained which were practically pure TEA, while the residue (50 grams) was a clear liquid at higher temperatures.

While particular embodiments of my invention have been described, it will be understood, of course, that the invention is not limited thereto, since many modifications may be made; and it is, therefore, contemplated to cover by the appended claims any such modifications as fall within the true spirit and scope of the invention. For example, it is within the scope of the invention to prepare the 1.5:1 mixed cyanide complex from the 2:1 complex in accordance with the following reaction:

(9) $3Na_{0.5}K_{0.5}(2Al(C_2H_5)_3)CN + 0.5NaCN + 0.5KCN \rightarrow 4Na_{0.5}K_{0.5}(1.5Al(C_2H_5)_3)CN$ The complex compounds of the mixed alkali metal cyanides and trialkylaluminum provide a number of advantages in the process of this invention. Under the conditions of the process, the complexes are liquid and thus are more easily handled than the alkali metal cyanides which are solids.

The invention having thus been described, what is claimed and desired to be secured by Letters Patent is:

1. As a new composition of matter, a complex compound of mixed sodium and potassium cyanides and triethylaluminum having the formula:

$$Na_{0.5}K_{0.5}(1.5Al(C_2H_5)_3)CN$$

2. As a new composition of matter, a complex compound of mixed sodium and potassium cyanides and triethylaluminum having the formula:

$$Na_{0.5}K_{0.5}(2Al(C_2H_5)_3)CN$$

3. The method of preparing a complex compound of mixed sodium and potassium cyanides and triethylaluminum having the formula:

$$Na_{0.5}K_{0.5}(1.5Al(C_2H_5)_3)CN$$

which comprises reacting equimolar amounts of sodium cyanide and potassium cyanide with aluminum triethyl, the amount of aluminum triethyl being 1.5 times the moles of alkali metal cyanide, at a temperature from room temperature to about 150° C. for from about 1 to about 30 minutes.

4. The method of preparing a complex compound of mixed sodium and potassium cyanides and triethylaluminum having the formula:

$$Na_{0.5}K_{0.5}(2Al(C_2H_5)_3)CN$$

which comprises reacting equimolar amounts of sodium cyanide and potassium cyanide with aluminum triethyl, the amount of aluminum triethyl being 2.0 times the moles of alkali metal cyanide, at a temperature from room temperature to about 150° C. for from about 1 to 30 minutes.

5. As a new composition of matter, a complex compound of mixed sodium and potassium cyanides and triethylaluminum having the general formula:

$$Na_xK_y(nAl(C_2H_5)_3)CN$$

wherein $x+y=1$ and $n=1.5$ to 2.

6. The method of preparing a complex compound of mixed sodium and potassium cyanides and triethylaluminum having the general formula $Na_xK_y(nAl(C_2H_5)_3)CN$ wherein $x+y=1$ and $n=1.5$ to 2 which comprises reacting $n$ moles of triethylaluminum with $x$ moles of NaCN and $y$ moles of KCN at a temperature from room temperature to about 150° C. for from about 1 to about 30 minutes.

References Cited in the file of this patent

UNITED STATES PATENTS 2,844,615    Ziegler _____ July 22, 1958

OTHER REFERENCES

Article by Ziegler et al. in Justus Liebigs Annalen der Chemie, March 1960, pages 33 to 49 (pages 33 to 35 and 46 to 48 particularly relied upon).